US012811738B2

(12) United States Patent
Karjalainen et al.

(10) Patent No.: US 12,811,738 B2
(45) Date of Patent: Nov. 24, 2026

(54) METHOD AND APPARATUS FOR SIMULTANEOUS TRANSMISSION OF UPLINK SOUNDING REFERENCE SIGNAL FOR USER EQUIPMENT

(71) Applicant: Nokia Technologies Oy, Espoo (FI)

(72) Inventors: Juha Pekka Karjalainen, Sotkamo (FI); Sami-Jukka Hakola, Kempele (FI); Timo Koskela, Oulu (FI); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 269 days.

(21) Appl. No.: 18/625,313

(22) Filed: Apr. 3, 2024

(65) Prior Publication Data

US 2024/0340131 A1 Oct. 10, 2024

Related U.S. Application Data

(60) Provisional application No. 63/494,916, filed on Apr. 7, 2023.

(51) Int. Cl.
*H04L 5/00* (2006.01)

(52) U.S. Cl.
CPC .......... *H04L 5/0048* (2013.01); *H04L 5/0094* (2013.01)

(58) Field of Classification Search
CPC .... H04W 72/23; H04L 5/0073; H04L 5/0048; H04L 5/0012; H04L 5/0051; H04L 5/0094; H04L 5/0035
See application file for complete search history.

(56) References Cited

U.S. PATENT DOCUMENTS

2023/0171771 A1* 6/2023 Guo .................... H04L 5/0094 370/329
2023/0318768 A1* 10/2023 Khoshnevisan ...... H04L 5/0048 370/329
2024/0048323 A1* 2/2024 Sun .................... H04L 5/0048
2024/0049146 A1* 2/2024 Sun .................... H04W 52/325
2024/0113835 A1* 4/2024 Chen .................... H04L 5/0048
(Continued)

FOREIGN PATENT DOCUMENTS

WO 2022120855 A1 6/2022

OTHER PUBLICATIONS

Extended European Search Report, dated Sep. 13, 2024, by the EPO, in EP Application No. 24165150.4, 37 pages.
(Continued)

*Primary Examiner* — Andrew Lee
(74) *Attorney, Agent, or Firm* — Barta Jones, PLLC

(57) ABSTRACT

Techniques are provided for facilitating simultaneous uplink sounding reference signal transmissions from user equipment. In relation to a base station, a method includes causing transmission of configuration indication state (TCI-state) information to be provided to at least one user equipment (UE). The TCI-state information includes information regarding a current TCI-state. In conjunction with the TCI-state information, the method includes causing one or more initialization parameters specific to the TCI-state to be provided for at least one uplink sounding reference signal (UL SRS) transmission with comb-offset hopping and/or cyclic-shift hopping. Corresponding methods, apparatus and computer program products are also provided for a base station and user equipment.

17 Claims, 8 Drawing Sheets

600

(56) References Cited

U.S. PATENT DOCUMENTS

| | | | | |
|---|---|---|---|---|
| 2024/0259843 | A1* | 8/2024 | Zhu | H04W 72/1273 |
| 2025/0071648 | A1* | 2/2025 | Hong | H04W 36/0058 |
| 2025/0168041 | A1* | 5/2025 | Liu | H04L 25/0226 |
| 2025/0202654 | A1* | 6/2025 | Jang | H04B 7/063 |
| 2025/0293914 | A1* | 9/2025 | Nilsson | H04L 5/0051 |

OTHER PUBLICATIONS

Yu Ding et al.; "Discussion on SRS enhancement targeting TDD CJT and 8 TX operation"; 3GPP TSG RAN WG1 #112; Athens, Greece, Feb. 27, 2023-Mar. 3, 2023; https://www.3gpp.org/ftp/TSG_RAN/WG1_RL1/TSGR1_112/Docs/R1-2300207; 3 pages.

Shinya Kumagai et al.; "Discussion on SRS enhancement"; 3GPP TSG RAN WG1 #112; Athens, Greece, Feb. 27, 2023-Mar. 3, 2023; https://www.3gpp.org/ftp/TSG_RAN/WG1_RL1/TSGR1_112/Docs/R1-2301481; 7 pages.

Fei Wang et al.; "Discussion on SRS enhancement targeting TDD CJT and 8 TX operation"; 3GPP TSG RAN WG1 #112; Athens, Greece, Feb. 27, 2023-Mar. 3, 2023; https://www.3gpp.org/ftp/TSG_RAN/WG1_RL1/TSGR1_112/Docs/R1-2300986; 9 pages.

Min Zhu et al.; "Discussion on SRS enhancement in Rel-18"; 3GPP TSG RAN WG1 #112; Athens, Greece, Feb. 27, 2023-Mar. 3, 2023; https://www.3gpp.org/ftp/TSG_RAN/WG1_RL1/TSGR1_112/Docs/R1-2300654; 6 pages.

* cited by examiner

```
        -- ASN1START
        -- TAG-TCI-STATE-START
        TCI-State ::= SEQUENCE {
        tci-StateId TCI-StateId,
        qcl-Type1 QCL-Info,
        qcl-Type2 QCL-Info OPTIONAL, -- Need R
        ...,
        [[
        additionalPCI-r17               AdditionalPCIIndex-r17 OPTIONAL, -- Need R
        pathlossReferenceRS-Id-r17      PUSCH-PathlossReferenceRS-Id OPTIONAL, -- Cond JointTCI
        ul-powerControl-r17             Uplink-powerControlId-r17 OPTIONAL -- Cond JointTCI
710 ──► srsCombAndCyclicHopping-r18                 srs-sequenceID-r18 -- Cond JointTCI ◄── 720

                ]]
                        }
                        --- void text ----
    -- TAG-TCI-STATE-STOP
    -- ASN1STOP
```

Fig. 7A

```
-- ASN1START
-- TAG-TCI-UL-STATE-START
      TCI-UL-State-r17 ::= SEQUENCE {
      tci-UL-State-Id-r17 TCI-UL-State-Id-r17,
      servingCellId-r17 ServCellIndex OPTIONAL, -- Need R
      bwp-Id-r17 BWP-Id OPTIONAL, -- Cond CSI-RSorSRS-Indicated
      referenceSignal-r17 CHOICE {
      ssb-Index-r17 SSB-Index,
      csi-RS-Index-r17 NZP-CSI-RS-ResourceId,
      srs-r17 SRS-ResourceId
      },
710 → srsCombAndCyclicHopping-r18                    comb-offset-value -- Cond UlTCI
712 → srsCombAndCyclicHoppingPart2-r18     cyclic-shift-offset value -- Cond UlTCI

      additionalPCI-r17 AdditionalPCIIndex-r17 OPTIONAL, -- Need R
      ul-powerControl-r17 Uplink-powerControlId-r17 OPTIONAL, -- Need R
      pathlossReferenceRS-Id-r17 PUSCH-PathlossReferenceRS-Id-r17 OPTIONAL, -- Need R
      ...
      }
-- TAG-TCI-UL-STATE-STOP
-- ASN1STOP
```

Fig. 7B

METHOD AND APPARATUS FOR SIMULTANEOUS TRANSMISSION OF UPLINK SOUNDING REFERENCE SIGNAL FOR USER EQUIPMENT

TECHNOLOGICAL FIELD

An example embodiment relates generally to techniques for wireless communication and, more particularly, to techniques for reducing interference between uplink sounding reference signals (UL SRS).

BACKGROUND

In communication systems, one or more user equipment (UE) may establish a radio resource control (RRC) connection with one or more base stations. The one or more UEs may create interference with each other when transmitting uplink sounding reference signals (UL SRS) simultaneously. The base station may be configured to control the UL SRS of the UE. Based at least in part on the reception of the UL SRS resources from the UEs, the base station may measure the UL radio channel and/or determine a downlink (DL) radio channel, such as in an instance in which the UE is configured for UL-DL channel reciprocity. The UL SRS may be utilized for a variety of different purposes including antenna-switching, beam management, codebook, and non-codebook.

With respect to codebook uses, the UE transmits a set of non-precoded UL SRS resources based on which the base station indicates the UL SRS resource, the transmit precoder matrix indicator (TPMI) and the rank indicator (RI) to be applied for scheduled PUSCH transmission. Codebook based transmission does not assume channel reciprocity so the UE is not able to generate uplink precoding weights based upon downlink measurements. With respect to non-codebook uses, the UE transmits a set of precoded UL SRS resources with each SRS being precoded using a different set of UE generated weights. Based on the UL SRS resource transmission, the base station indicates to the UE which of the UL SRS resources are used as precoder weights for PUSCH transmission. Non-codebook based transmission assumes channel reciprocity so the UE is able to generate uplink precoding weights based upon downlink measurements.

However, the interference created by the UL SRS from different UEs may limit the utility of the UL SRS.

BRIEF SUMMARY

A method, apparatus and computer program product are provided for mitigating interference of uplink sounding reference signals (UL SRS) from a plurality of UEs to at least one base station. In an example embodiment, interference of the UL SRS may be mitigated by utilizing transmission of configuration indicator state (TCI-state) as another parameter by which to distinguish UL SRS transmitted by the plurality of UEs.

In an example embodiment, a method is provided that includes causing transmission of configuration indication state (TCI-state) information to be provided to at least one user equipment (UE). The TCI-state information may comprise information regarding a current TCI-state. The method also includes, in conjunction with the TCI-state information, causing one or more initialization parameters specific to the TCI-state to be provided for at least one uplink sounding reference signal (UL SRS) transmission with comb-offset hopping and/or cyclic-shift hopping.

The method of an example embodiment causes the one or more initialization parameters specific to the TCI-state to be provided by providing the one or more initialization parameters via a TCI-state specific information element. In an example embodiment, the TCI-state information element comprises at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell identifier (ID), an UL SRS resource ID, an UL SRS resource set ID, or a TCI-state ID.

In another example embodiment, an apparatus is provided that includes at least one processor and at least one memory storing instructions that, when executed by the at least one processor, cause the apparatus at least to cause transmission of configuration indication state (TCI-state) information to be provided to at least one user equipment (UE). The TCI-state information may comprise information regarding a current TCI-state. The apparatus is also caused to, in conjunction with the TCI-state information, cause one or more initialization parameters specific to the TCI-state to be provided for at least one uplink sounding reference signal (UL SRS) transmission with comb-offset hopping and/or cyclic-shift hopping.

The apparatus of an example embodiment may cause the one or more initialization parameters specific to the TCI-state to be provided by providing the one or more initialization parameters via a TCI-state specific information element. In this example embodiment, the TCI-state specific information element may comprise at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell identifier (ID), an UL SRS resource ID, an UL SRS resource set ID, or a TCI-state ID.

In a further example embodiment, a computer program product is provided that comprises at least one non-transitory computer readable storage medium having computer executable program code instructions stored therein with the computer executable program code instructions comprising program code instructions configured, upon execution, to cause transmission of configuration indication state (TCI-state) information to be provided to at least one user equipment (UE). The TCI-state information may comprise information regarding a current TCI-state. The computer executable program code instructions may further comprise program code instructions configured, upon execution, to, in conjunction with the TCI-state information, cause one or more initialization parameters specific to the TCI-state to be provided for at least one uplink sounding reference signal (UL SRS) transmission with comb-offset hopping and/or cyclic-shift hopping.

The program code instructions configured to cause the one or more initialization parameters specific to the TCI-state to be provided may comprise program code instructions configured to provide the one or more initialization parameters via an TCI-state specific information element. In this example embodiment, the TCI-state specific information element may comprise at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell identifier (ID), an UL SRS resource ID, an UL SRS resource set ID, or a TCI-state ID.

In yet another example embodiment, an apparatus is provided that includes means for causing transmission of configuration indication state (TCI-state) information to be provided to h at least one user equipment (UE) The TCI-state information may comprise information regarding a current TCI-state. The apparatus also includes means for, in conjunction with the TCI-state information, causing one or more initialization parameters specific to the TCI-state to be provided for at least one uplink sounding reference signal (UL SRS) transmission with comb-offset hopping and/or cyclic-shift hopping.

The means for causing the one or more initialization parameters specific to the TCI-state to be provided may include means for providing the one or more initialization parameters via an TCI-state specific information element. In this example embodiment, the TCI-state specific information element comprises at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell identifier (ID), an UL SRS resource ID, an UL SRS resource set ID, or a TCI-state ID.

In an example embodiment, a method is provided that includes receiving one or more transmission configuration indication state (TCI-state) information from at least one base station. The method also includes, in conjunction with the TCI-state information, receiving one or more initialization parameters specific to the TCI-state to be provided for at least one uplink sounding reference signal (UL SRS) transmission with comb-offset hopping and/or cyclic-shift hopping. The method further includes causing a user equipment to apply the one or more initialization parameters for at least one UL SRS transmission with the comb-offset hopping and/or cyclic-shift hopping.

Receiving one or more initialization parameters may include receiving the one or more initialization parameters specific to the TCI-state via a TCI-state specific information element. In an example embodiment, the TCI-state specific information element comprises at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell ID, an UL SRS resource ID, an UL SRS resource set ID, or a TCI-state ID.

In a further example embodiment, an apparatus is provided that includes at least one processor and at least one memory storing instructions that, when executed by the at least one processor, cause the apparatus at least to receive one or more transmission configuration indication state (TCI-state) information from at least one base station. The apparatus is also caused to, in conjunction with the TCI-state information, receive one or more initialization parameters specific to the TCI-state to be provided for at least one uplink sounding reference signal (UL SRS) transmission with comb-offset hopping and/or cyclic-shift hopping. The apparatus is further caused to cause a user equipment to apply the one or more initialization parameters for at least one UL SRS transmission with the comb-offset hopping and/or cyclic-shift hopping.

The apparatus of an example embodiment is caused to receive one or more initialization parameters specific to the TCI-state by receiving the one or more initialization parameters via an TCI-state specific information element. In an example embodiment, the TCI-state specific information element comprises at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell ID, an UL SRS resource ID, an UL SRS resource set ID, or a TCI-state ID.

In another example embodiment, a computer program product is provided that comprises at least one non-transitory computer readable storage medium having computer executable program code instructions stored therein with the computer executable program code instructions comprising program code instructions configured, upon execution, to receive one or more transmission configuration indication state (TCI-state) information from at least one base station. The computer executable program code instructions also comprise program code instructions configured, upon execution, to, in conjunction with the TCI-state information, receive one or more initialization parameters specific to the TCI-state to be provided for at least one uplink sounding reference signal (UL SRS) transmission with comb-offset hopping and/or cyclic-shift hopping. The computer executable program code instructions further comprise program code instructions configured, upon execution, to cause a user equipment to apply the one or more initialization parameters for at least one UL SRS transmission with the comb-offset hopping and/or cyclic-shift hopping.

The program code instructions configured to receive one or more initialization parameters specific to the TCI-state in one example embodiment comprise program code instructions configured to receive the one or more initialization parameters via an TCI-state specific information element. In an example embodiment, the TCI-state specific information element comprises at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell ID, an UL SRS resource ID, an UL SRS resource set ID, or a TCI-state ID.

In yet another example embodiment, an apparatus is provided that includes means for causing receiving one or more transmission configuration indication state (TCI-state) information from at least one base station. The apparatus also includes means, in conjunction with the TCI-state information, means for receiving one or more initialization parameters specific to the TCI-state to be provided for at least one uplink sounding reference signal (UL SRS) transmission with comb-offset hopping and/or cyclic-shift hopping. The apparatus further includes means for causing a user equipment to apply the one or more initialization parameters for at least one UL SRS transmission with the comb-offset hopping and/or cyclic-shift hopping.

The means for receiving one or more initialization parameters specific to the TCI-state may comprise means for receiving the one or more initialization parameters via an TCI-state specific information element. In an example embodiment, the TCI-state specific information element comprises at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell ID, an UL SRS resource ID, an UL SRS resource set ID, or a TCI-state ID.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
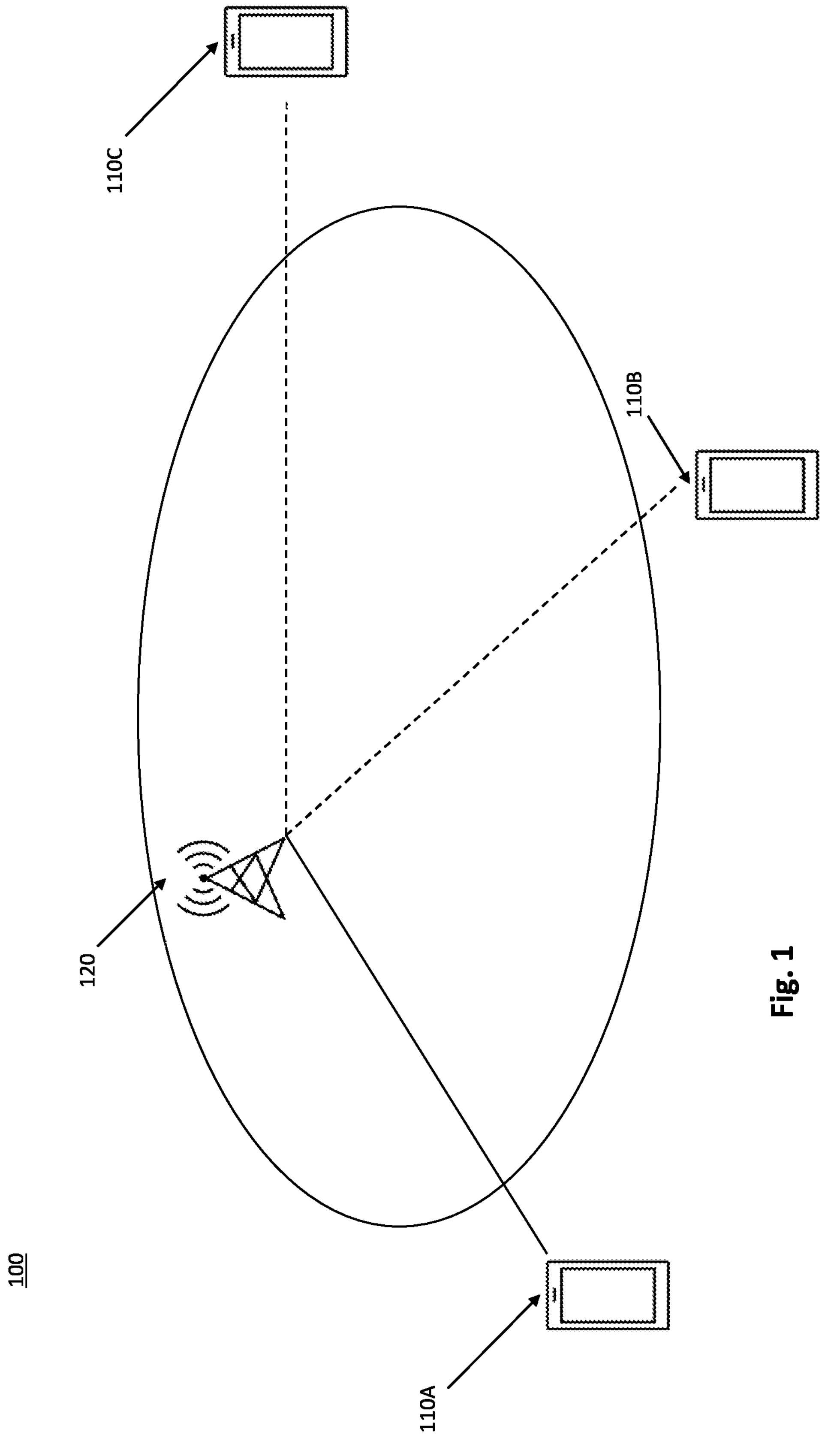
Figure 2:
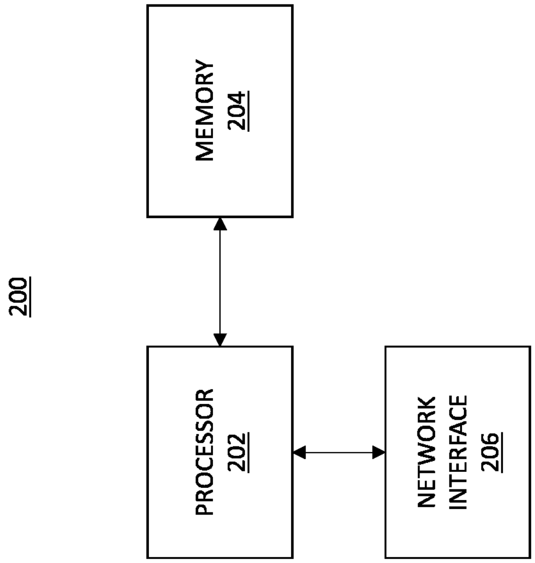
Figure 3:
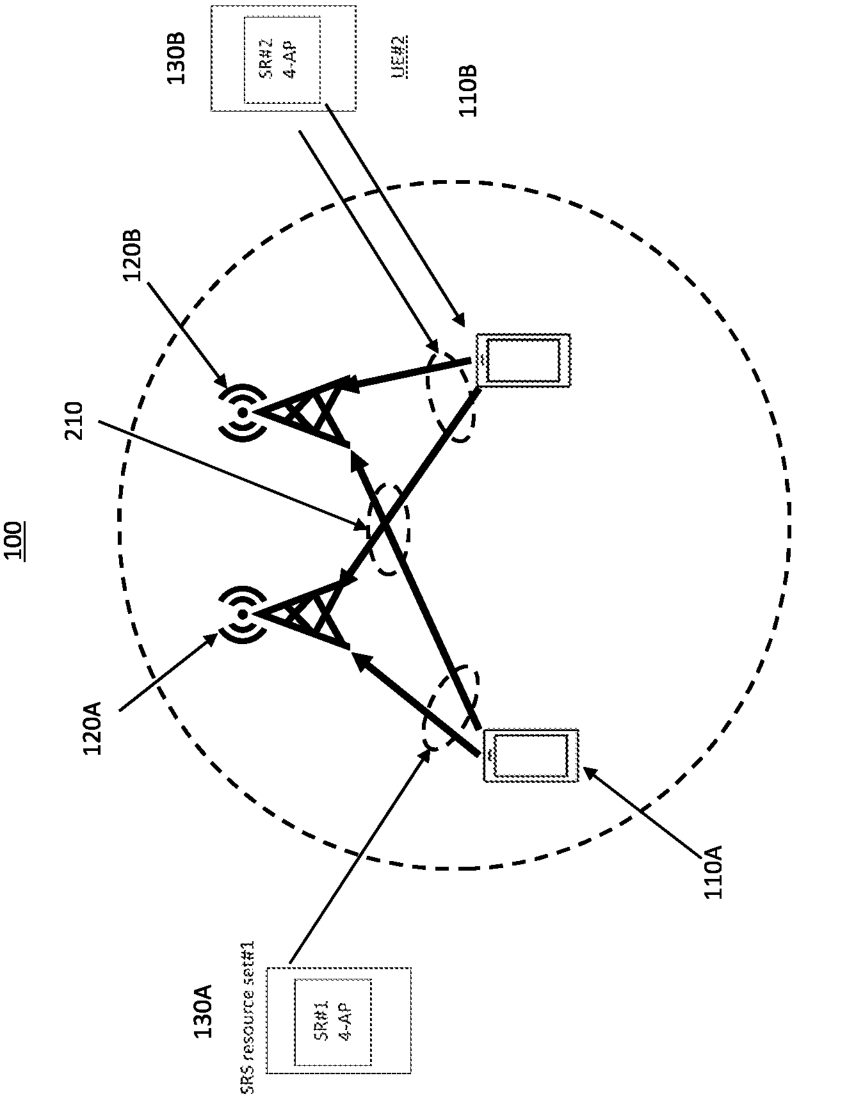
Figure 4:
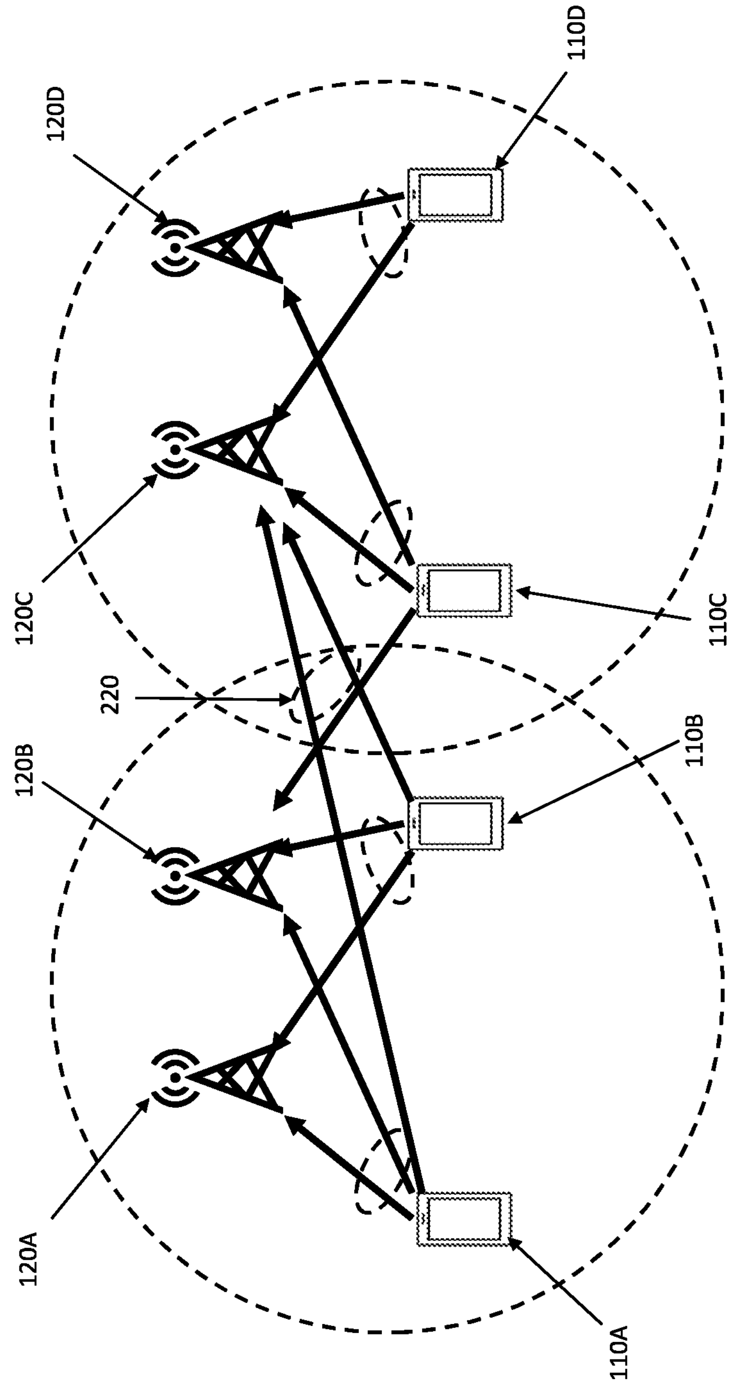
Figure 5:
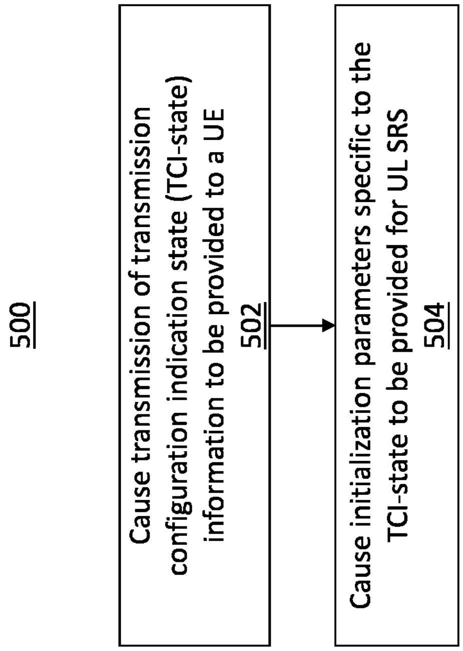
Figure 6:
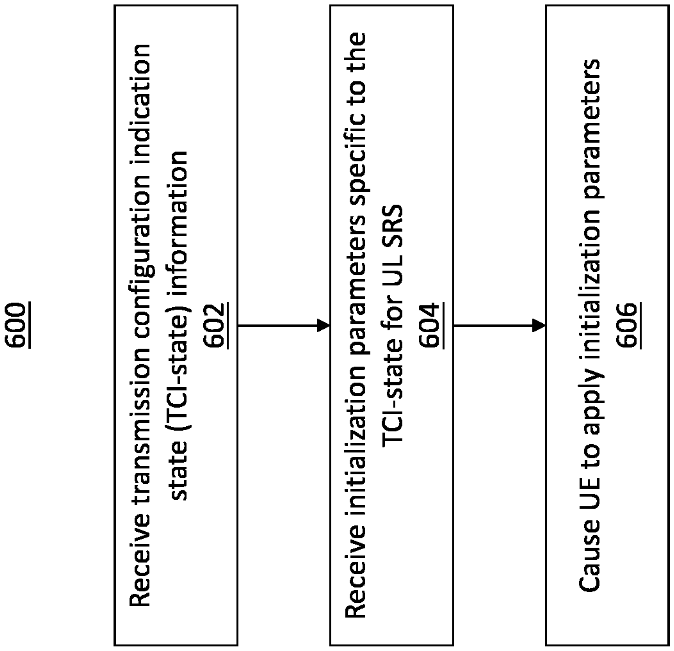

Having thus described certain example embodiments of the present disclosure in general terms, reference will hereinafter be made to the accompanying drawings, which are not drawn to scale, and wherein:

FIG. 1 illustrates an example of a communication system in which an example embodiment of the present disclosure may be implemented;

FIG. 2 illustrates a block diagram of an apparatus that may be configured in accordance with an example embodiment of the present disclosure;

FIG. 3 illustrates an example configuration of intra-cluster interference in accordance with an example embodiment of the present disclosure;

FIG. 4 illustrates an example configuration of inter-cluster interference in accordance with an example embodiment of the present disclosure;

FIG. 5 illustrates an example workflow implemented by a base station in accordance with an example embodiment of the present disclosure;

FIG. 6 illustrates an example workflow implemented by a user equipment in accordance with an example embodiment of the present disclosure; and FIGS. 7A-7B illustrate an example implementation in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising".

The phrases "in one embodiment," "according to one embodiment," "in some embodiments," "in various embodiments", and the like generally refer to the fact that the particular feature, structure, or characteristic following the phrase may be included in at least one embodiment of the present disclosure, but not necessarily all embodiments of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

As illustrated in FIG. 1, a communication network 100 is provided via which uplink sounding reference signals (UL SRS) are transmitted from a plurality of UEs to one or more base stations in accordance with various embodiments of the present disclosure. In some embodiments, the communication system 100 comprises at least one user equipment (UE) 110A, 110B, 110C (collectively "110") and/or at least one base station 120. The at least one base station and/or the UE may be configured to operate in one or more frequency bands. For example, the at least one base station may be configured to also operate in the FR2 band and/or the base station may be configured to operate in the FR1 band. Regardless of the band, the apparatus, method and computer program product of an example embodiment are configured to implement a process for mitigating interference of UL SRS from a plurality of UEs to at least one base station.

In some embodiments, the communication network 100 is in communication with a plurality of user equipment (UE) 110A, 110B, 110C (collectively "110") and/or at least one base station 120. By way of example, the network 100 may be deployed within a radio access architecture based on long term evolution advanced (LTE Advanced, LTE-A) and/or new radio (NR, 5G). However, the system may be deployed in other network architectures including within other communication networks including, for example, other communication networks developed in the future, e.g., sixth generation (6G) networks, as well as any of a number of existing networks including a universal mobile telecommunications system (UMTS) radio access network (UTRAN, E-UTRAN or NG-RAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The UE 110 may be any type of user terminal, terminal device, etc. to which resources on the air interface are allocated and assigned. For example, the UE may be a portable computing device such as a wireless mobile communication device including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. The user equipment may also be called a subscriber unit, mobile station, remote terminal, access terminal, user terminal or user equipment (UE) just to mention but a few names or apparatuses.

The at least one base station 120, is a network element and may be embodied by any of a variety of access points. For example, the cells may be embodied by a base station, a Node B, e.g., a gNB, or the like.

Referring now to FIG. 2, an example apparatus 200 is provided. In the context of a base station, the apparatus 200 may be embodied by or otherwise associated with a network device. the network device may, in turn, be embodied by, associated with or in communication with the base station. In the context of a user equipment, the apparatus may be embodied by or otherwise associated with the user equipment (UE).

Regardless of the device that embodies the apparatus 200, the apparatus may include processor 202, memory 204, and network interface 206. The apparatus 200 may be configured to execute the operations described herein. Although these components are described with respect to the performance of various functions, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with an example embodiment disclosed herein.

The processor 202 may be embodied in a number of different ways and may, for example, include one or more processing devices configured to perform independently. In some non-limiting embodiments, the processor 202 may include one or more processors configured in tandem via a bus to enable independent execution of instructions, pipelining, and/or multithreading. The use of the term "processor" may be understood to include a single core processor, a multi-core processor, multiple processors internal to the apparatus, and/or remote or "cloud" processors.

In some embodiments, the processor 202 may be configured to execute instructions stored in the memory 204 and/or circuitry otherwise accessible to the processor 202. In some embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may optionally include input/output circuitry that may, in turn, be in communication with processor 202 to provide output to a user and/or other entity and, in some embodiments, to receive an indication of an input. The input/output circuitry may comprise a user interface and may include a display, and may comprise a web user interface, a mobile application, a query-initiating computing device, a kiosk, or the like. In some embodiments, the input/output circuitry may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The network interface 206 may be any means such as a device or circuitry embodied in either hardware or a combination of hardware and software that is configured to receive and/or transmit data from/to a network and/or any other device, circuitry, or module in communication with the apparatus 200. In this regard, the network interface 206 may include, for example, a network interface for enabling communications with a wired or wireless communication network, such as the user equipment (UE) and/or the base station. For example, the network interface 206 may include one or more network interface cards, antennae, buses, switches, routers, modems, and supporting hardware and/or software, or any other device suitable for enabling communications via a network. Additionally, or alternatively, the network interface 206 may include the circuitry for interacting with the antenna/antennae to cause transmission of signals via the antenna/antennae or to handle receipt of signals received via the antenna/antennae.

FIG. 3 depicts an example configuration of a communication system with intra-cluster interference. In this example, the depicted communication system 100 may comprise of a plurality of user equipment (UE) 110A, 110B (collectively "110") and a plurality of base stations 120A, 120B (collectively "120"). A first UE 110A may be configured to communicate with both a first base station 120A and a second base station 120B in a time division duplex (TDD) manner. Similarly, a second UE 110B may communicate with both the first base station 120A and the second base station 120B, also in a TDD manner. In the depicted embodiment, the uplink sounding reference signal (UL SRS) from each UE may cause interference with the UL SRS from the other UE in a frequency domain. The different user specific sounding resource signals (SRS) from the plurality of UEs 110A, 120B may cause interference as a result of an overlap in the resource element (RE) domain (e.g., by sharing the same symbol, the same physical resource blocks (PRBs), the same comb-type and comb offset, etc.)

With further reference to FIG. 3, the first user equipment 110A may comprise a first sounding reference signal (SRS) set 130A, and the second user equipment (UE) 110B may comprise a second sounding reference signal (SRS) set 130B. In the depicted example, the first UE 110A, when communicating with the second base station 120B, and the second UE 110B, when communicating with the first base station 120A, may cause intra-cluster interference 210, whereby the UL SRS from each UE 110A, 110B may interfere with the UL SRS from the other UE. Multiple clusters can be deployed, within a communication system 100, with each individual cluster comprising one or more transmission and reception point(s) (TRPs) sharing a cluster specific physical cell identifier and with the UEs sharing the same cluster specific UL SRS Zadoff-Chu (ZC)-sequences group index (e.g., the same root sequence out of 30 different groups of sequences). In this regard, it may be assumed that a set of TRPs shares at least one physical cell ID within same cluster and that the UEs 110A, 110B share UL SRS ZC-sequences configured with same root sequences, thereby further creating a risk for intra-cluster interference.

Referring to FIG. 4, an example configuration of a communication system that exhibits inter-cluster interference is depicted. The communication system 100 of FIG. 4 may be comprised of a plurality of user equipment (UE) 110A, 110B, 110C, 110D (collectively "110") and a plurality of base stations 120A, 120B, 120C, 120D (collectively "120") in communication therewith, such as via TDD communications. As shown, a first UE 110A may be configured to communicate with a first base station 120A and a second base station 120B. A second UE 110B may communicate with the first base station 120A, the second base station 120B, and a third base station 120C. A third UE 110C may communicate with the second base station 120B, the third base station 120C, and a fourth base station 120D. And, a fourth UE 110D may be configured to communicate with the third base station 120C and the fourth base station 120D. In the depicted example, the uplink sounding reference signal (UL SRS) from each UE may cause interference with the UL SRS from the other UEs in a frequency domain. The different user specific sounding resource signals (SRS) from the plurality of UEs 110A, 120B may cause overlap in a resource element (RE) domain (e.g., by sharing the same symbol, the same PRBs, the same comb-type and comb offset, etc.)

With further reference to FIG. 4, the second user equipment (UE) 110B may comprise a second sounding reference signal (SRS) set (not depicted), and the third user equipment (UE) 110C may comprise a third sounding reference signal (SRS) set (not depicted). Thus, the second UE 110B, when communicating with the third base station 120C, and the third UE 110C, when communicating with the second base station 120B, may cause inter-cluster interference 220, whereby the UL SRS from each UE 110B, 110C may interfere with the UL SRS from the other UE. Additionally, one or more transmission and reception point(s) (TRPs) may share at least one same physical cell identifier within a cluster and/or the UEs 120B, 120C with UL SRS ZC-sequences may be configured with same root sequences, thereby further increasing the risk of UL SRS interference.

In order to mitigate interference between the UL SRS transmitted by UEs, transmission configuration indication states (TCI-states) and associated initialization parameters specific to the TCI-state may be provided to the UEs with the UEs then applying the initialization parameter(s) for the UL SRS transmission with the comb-offset hopping and/or cyclic-shift hopping, thereby serving to distinguish the UL SRS transmitted by the UEs and mitigating the interference therebetween. In 5G NR, a Transmission Configuration Indication state (TCI-state) is used to establish the Quasi co-location (QCL) connection between a target reference signal and the source reference signal. Future standards may define a signal of an equivalent purpose having a different name with such a signal being considered a TCI-state for purposes of the present disclosure. Referring now to FIGS. 5 and 6, example flowcharts are provided of the operations performed by an apparatus, such as the apparatus of FIG. 2, embodied by a base station with respect to FIG. 5 and a user equipment (UE) with respect to FIG. 6.

Referring now to FIG. 5, an example method 500 is illustrated that can be carried out by an apparatus as embodied by the base station with the apparatus including means, such as the processor 202, the memory 204, and the network interface 206, or the like, for causing transmission of configuration indication state (TCI-state) information to be provided to at least one UE. See block 502. The TCI-state information may comprise information regarding a current TCI-state.

In conjunction with the TCI-state information, the apparatus also includes means, such as the processor 202, the memory 204, the network interface 206, or the like, for causing one or more initialization parameters specific to the TCI-state to be provided for at least one uplink sounding reference signal (UL SRS) transmission with comb-offset hopping and/or cyclic-shift hopping. Sec block 504. As used herein, UL SRS transmission with comb-offset hopping and/or cyclic-shift hopping includes UL SRS transmission with comb-offset hopping but without cyclic-shift hopping, UL SRS transmission with cyclic-shift hopping but without comb-offset hopping and UL SRS transmission with both, that is, with a combination of, comb-offset hopping and cyclic-shift hopping. The apparatus embodied by the base station may provide the one or more initialization parameters via an TCI-state specific information element. The TCI-state specific information element may comprise at least one of the following: an SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell identifier (ID), an UL SRS resource ID, an UL SRS resource set ID, or a TCI-state ID.

Referring to FIGS. 7A-7B, example implementations of one or more TCI-states being provided to at least one user equipment (UE) are depicted. As shown, one or more uplink sounding reference signal (UL SRS) comb-offset and/or cyclic-shift hopping may be initialized with a specific TCI-state. The specific TCI-state may comprise information regarding specific initialization parameters. In various embodiments, the TCI-state may comprise an TCI-state specific information element (IE) and the TCI-state specific IE may, in turn, comprise at least one of the following: a SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell identifier (ID), an UL SRS resource ID, an UL SRS resource set ID, or a TCI-state ID. The TCI-state specific IE may further comprise at least one UL SRS sequence ID 720.

With further reference to FIGS. 7A-7B, the code 700 that defines the TCI state and the initialization specific to the TCI-state may further comprise an srsCombAndCyclicHopping-r18 information element (IE) designated 710. The srsCombAndCyclicHopping-r18 IE may be used to configure initial parameters for UL SRS comb-offset hopping and cyclic-shift hopping for a specific TCI-state for a specific user equipment (UE). For example, the srsCombAndCyclicHopping-r18 line of code 710 may introduce and define at least one of the following elements: SRS sequence identity, C-RNTI associated with triggering UL/DL downlink control information (DCI) for UL SRS or DL DCI associated with indicated TCI state(s), slot index of an UL SRS resource within a radio frame, an orthogonal frequency division multiplexing (OFDM) symbol index of a triggered/configured UL SRS resource, comb-offset, cyclic-shift offset, physical cell ID, and/or TCI-state ID.

With further reference to FIG. 7B, in various embodiments, an example implementation may comprise a second IE, namely, srsCombAndCyclicHoppingPart2-r18 designated 712. The first IE and/or the second IE may associate one or two DL and/or UL SRS with a corresponding quasi-colocation (QCL) type. In various embodiments, the at least one user equipment (UE) may receive a downlink control information (DCI) signal from a base station that may comprise information regarding a transmission configuration indication (TCI) codepoint with at least one indicated TCI-state. The UE may be configured to apply the indicated TCI-state and its initialization parameters (e.g., UL SRS comb-offset hopping and cyclic-shift hopping). The indicated TCI-state may be associated with a slot index (=X1) and/or a symbol index (=X2) information elements, wherein X1 and X2 could be also any values that have been defined. The indicated TCI-state may be further configured with at least one UL SRS resource set with a followUnifiedTCIstateSRS-r17 information element. Thus, a UE of an example embodiment may be configured to determine the initialization of the frequency domain starting position of the UL SRS resource for comb-offset hopping initialization as defined by:

$$\bar{k}_0^{(p_i)} = n_{shift} N_{sc}^{RB} + \left(k_{TC}^{(p_i)} + g(X1, X2)\right) \bmod K_{TC}$$

$K_{TC}$ may be the transmission comb-number, wherein $K_{TC}$={2, 4, 8}.

$$N_{sc}^{RB}$$

may be the number of resource elements in a physical resource block (e.g., 12 resource elements), and g (X1, X2) may define the function of at least two TCI-state specific initialization parameters. For example, X1 may equal a slot offset and/or X2 may equal the orthogonal frequency division multiplexing (OFDM) symbol index.

In various embodiments, the g ( ) function may further be a function of at least one TCI-state specific initialization parameter. In various embodiments, the parameter $$k_{TC}^{(p_i)}$$

may define the value of a comb-offset shift value with the value being common for at least one antenna port associated to a UL SRS resource. In various embodiments, at least one user equipment (UE) may be able to determine a cyclic shift $\alpha_i$ for antenna port $p_i$ based at least in part on an indicated TCI-state from a base station. The cyclic shift may be defined by:

$$\alpha_i = 2\pi \frac{n_{SRS}^{cs,i}}{n_{SRS}^{cs,max}}$$

$$n_{SRS}^{cs,i} = \begin{cases} \left(n_{SRS}^{cs} + q(X1) + \dfrac{n_{SRS}^{cs,max} \lfloor (p_i^{cs,max} - 1000)/2 \rfloor}{n_{ap}^{SRS}/2}\right) \bmod n_{SRS}^{cs,max}, \\ \quad \text{if } n_{ap}^{SRS} = 4 \text{ and } n_{SRS}^{cs,max} = 6 \\ \left(n_{SRS}^{cs} + q(X1) + \dfrac{(n_{SRS}^{cs,max} p_i^{cs,max} - 1000)}{n_{ap}^{SRS}}\right), \text{otherwise} \end{cases}$$

In various embodiments, $$n_{SRS}^{cs,i}$$

may be equal to $$\{0, 1, \ldots, n_{SRS}^{cs,\max}\},$$

wherein $$n_{SRS}^{cs,i}$$

may be the cyclic-shift offset defined by high layers.

$$n_{SRS}^{cs,max}$$

may be the maximum number of cyclic-shifts that is predefined. For example, TS 38.211 defines the maximum number of cyclic shifts as a function of the transmission comb number with transmission comb numbers of 2, 4 and 8 defining a maximum number of 8, 12 and 6 cyclic shifts, respectively. The operation $\lfloor \ \rfloor$ defines a floor operation. Also, q(X1) defines at least one function of a TCI-state specific initialization parameter. For example, X1 may equal a slot index with the slot index being provided with the TCI-state information to at least on UE. In some embodiments, the function q( ) may be further a function of two or more TCI-state specific initialization parameters.

In various embodiments, the comb-number and/or the maximum number of cyclic shifts as a function of the comb-number enables the use of one or more additional dimensions (e.g., TCI-state) to be provided to at least one user equipment (UE). The additional dimensions are configured to enhance uplink sounding reference signal (UL SRS) interference randomization resulting in the ability to sub-divide a single cluster and/or multiple clusters into individual TCI-states with each individual TCI-state being associated with different transmission and reception points (TRPs). Each individual TRP can be configured with individual TCI-state specific initialization parameters resulting in an increase of channel state indicator (CSI) quality for UL and DL transmission.

Referring now to FIG. 6, an example flowchart illustrating the operations performed, such as by an apparatus as depicted in FIG. 2 and embodied as the user equipment (UE). Referring now to FIG. 6, a method 600 is illustrated that can be carried out by an apparatus embodied by a user equipment and that comprises means, such as the processor 202, memory 204, and the network interface 206 or the like, for receiving one or more transmission configuration indication state (TCI-state) information from at least one base station. See block 602.

The apparatus further includes means, such as the processor 202, the memory 204, the network interface, or the like, for receiving one or more initialization parameters specific to the TCI-state to be provided for at least one uplink sounding reference signal (UL SRS) transmission with comb-offset hopping and/or cyclic-shift hopping. See block 604. The one or more initialization parameters for UL SRS Comb-offset and/or cyclic-shift hopping transmission may be received via an TCI-state specific information element. For example, in an instance in which the UE is configured with a DLorJoint-TCIState or an UL-TCIState and the UL SRS resource set is configured with followUnifiedTCIstateSRS-r17, the UE is configured to assume that the comb-offset hopping and cyclic-shift hopping initialization parameters are provide via a TCI-state specific information element (IE), e.g., the srsCombAndCyclicHopping IE as described above with respect to FIGS. 7A and 7B. In this regard, the TCI-state specific information element may comprise at least one of the following: an SRS sequence identity, a cell radio network temporary identity (C-RNTI), a slot index of an UL SRS resource within a radio frame, an orthogonal frequency division multiplexing (OFDM) symbol index of a triggered/configured UL SRS resource, a comb-offset, a cyclic-shift offset, a physical cell ID, an UL SRS resource ID, an UL SRS resource set ID, or a TCI-state ID.

The apparatus further includes means, such as the processor 202, the memory 204, the network interface, or the like, for causing the user equipment to apply the one or more initialization parameters specific to the TCI-state for at least one UL SRS transmission with the comb-offset hopping and/or cyclic-shift hopping. By applying the initialization parameters associated with the TCI-state, the UL SRS from the UE may be better distinguished from the UL SRS from other UEs, thereby mitigating UL SRS interference. In this regard, the additional dimensions provided by the initialization parameters specific to the TCI-state enhance UL SRS interference randomization by sub-dividing a single cluster and/or multiple clusters into individual TCI-states with each individual TCI-state being associated with different TRPs, each of which are configured with individual TCI-state specific initialization parameters. By mitigating UL SRS interference, the channel state indicator (CSI) quality for UL and DL transmissions may be increased.

FIGS. 5 and 6 illustrate flowcharts depicting operations according to an example embodiment of the present disclosure. It will be understood that each block of the flowcharts and combination of blocks in the flowcharts may be implemented by various means, such as hardware, firmware, processor, circuitry, and/or communication devices associated with execution of software including one or more program instructions. For example, one or more of the procedures or operations described above may be embodied by computer program instructions. In this regard, the computer program instruction which embody the procedures or operations described above may be stored by a memory 204 of an apparatus (e.g., apparatus 200, UE 110, base station 120) employing an embodiment of the present invention and executed by a processor 202. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

The invention claimed is:

1. A method comprising:

receiving transmission configuration indication state (TCI-state) information from at least one base station via a TCI-state specific information element, wherein the TCI-state specific information element comprises the following: a sounding reference signal (SRS) sequence identity, a cell radio network temporary identity (C-RNTI), a slot index of an UL SRS resource within a radio frame, an orthogonal frequency division multiplexing (OFDM) symbol index of a triggered/configured upling (UL) SRS resource, a comb-offset, a cyclic-shift offset, a physical cell ID, an UL SRS resource ID, an UL SRS resource set ID, and a TCI-state ID;

in conjunction with the TCI-state information, receiving one or more initialization parameters specific to the TCI-state to be provided for at least one UL SRS transmission with comb-offset hopping and cyclic-shift hopping;

causing a user equipment to apply the one or more initialization parameters for at least one UL SRS transmission with the comb-offset hopping and cyclic-shift hopping; and based on the one or more initialization parameters, enabling a use of additional TCI-states configured to enhance UL SRS interference randomization providing an ability to sub-divide a single cluster and multiple clusters into individual TCI-states with each individual TCI-state being associated with different transmission and reception points (TRPs), wherein each individual TRP is configured with individual TCI-state specific initialization parameters for an increase of channel state indicator (CSI) quality for UL and downlink (DL) transmission.

2. The method of claim 1, wherein applying the one or more initialization parameters for at least one UL SRS transmission with the comb-offset hopping and cyclic-shift hopping distinguishes the UL SRS transmitted by the UE and mitigating interference therebetween.

3. The method of claim 2, wherein TCI-state is used to establish a Quasi co-location (QCL) connection between a target reference signal and a source reference signal.

4. The method of claim 3, wherein the TCI-state information is received via a downlink control information (DCI) signal from a base station.

5. The method of claim 4, wherein the TCI-state information comprises information regarding a TCI codepoint with at least one indicated TCI-state.

6. The method of claim 5, wherein causing the user equipment to apply the one or more initialization parameters for at least one UL SRS transmission with the comb-offset hopping and cyclic-shift hopping comprises to applying the indicated TCI-state and respective initialization parameters.

7. A user equipment comprising:

a processor; and a memory comprising non-transitory computer-executable instructions that, when executed by the processor, cause the processor to perform the following operations:

receiving transmission configuration indication state (TCI-state) information from at least one base station via a TCI-state specific information element, wherein the TCI-state specific information element comprises the following: a sounding reference signal (SRS) sequence identity, a cell radio network temporary identity (C-RNTI), a slot index of an UL SRS resource within a radio frame, an orthogonal frequency division multiplexing (OFDM) symbol index of a triggered/configured upling (UL) SRS resource, a comb-offset, a cyclic-shift offset, a physical cell ID, an UL SRS resource ID, an UL SRS resource set ID, and a TCI-state ID;

in conjunction with the TCI-state information, receiving one or more initialization parameters specific to the TCI-state to be provided for at least one UL SRS transmission with comb-offset hopping and cyclic-shift hopping;

causing the user equipment to apply the one or more initialization parameters for at least one UL SRS transmission with the comb-offset hopping and cyclic-shift hopping; and based on the one or more initialization parameters, enabling a use of additional TCI-states configured to enhance UL SRS interference randomization providing an ability to sub-divide a single cluster and multiple clusters into individual TCI-states with each individual TCI-state being associated with different transmission and reception points (TRPs), wherein each individual TRP is configured with individual TCI-state specific initialization parameters for an increase of channel state indicator (CSI) quality for UL and downlink (DL) transmission.

8. The user equipment of claim 7, wherein applying the one or more initialization parameters for at least one UL SRS transmission with the comb-offset hopping and cyclic-shift hopping distinguishes the UL SRS transmitted by the UE and mitigating interference therebetween.

9. The user equipment of claim 8, wherein TCI-state is used to establish a Quasi co-location (QCL) connection between a target reference signal and a source reference signal.

10. The user equipment of claim 9, wherein the TCI-state information is received via a downlink control information (DCI) signal from a base station.

11. The user equipment of claim 10, wherein the TCI-state information comprises information regarding a TCI codepoint with at least one indicated TCI-state.

12. The user equipment of claim 11, wherein causing the user equipment to apply the one or more initialization parameters for at least one UL SRS transmission with the comb-offset hopping and cyclic-shift hopping comprises to applying the indicated TCI-state and respective initialization parameters.

13. A system comprising:

a user equipment;

a processor; and a memory comprising non-transitory computer-executable instructions that, when executed by the processor, cause the processor to perform the following operations:

receiving transmission configuration indication state (TCI-state) information from at least one base station via a TCI-state specific information element, wherein the TCI-state specific information element comprises the following: a sounding reference signal (SRS) sequence identity, a cell radio network temporary identity (C-RNTI), a slot index of an UL SRS resource within a radio frame, an orthogonal frequency division multiplexing (OFDM) symbol index of a triggered/configured upling (UL) SRS resource, a comb-offset, a cyclic-shift offset, a physical cell ID, an UL SRS resource ID, an UL SRS resource set ID, and a TCI-state ID;

in conjunction with the TCI-state information, receiving one or more initialization parameters specific to the TCI-state to be provided for at least one UL SRS transmission with comb-offset hopping and cyclic-shift hopping;

causing the user equipment to apply the one or more initialization parameters for at least one UL SRS transmission with the comb-offset hopping and cyclic-shift hopping; and based on the one or more initialization parameters, enabling a use of additional TCI-states configured to enhance UL SRS interference randomization providing an ability to sub-divide a single cluster and multiple clusters into individual TCI-states with each individual TCI-state being associated with different transmission and reception points (TRPs), wherein each individual TRP is configured with individual TCI-state specific initialization parameters for an increase of channel state indicator (CSI) quality for UL and downlink (DL) transmission.

14. The system of claim 13, wherein applying the one or more initialization parameters for at least one UL SRS transmission with the comb-offset hopping and cyclic-shift hopping distinguishes the UL SRS transmitted by the UE and mitigating interference therebetween.

15. The system of claim 14, wherein TCI-state is used to establish a Quasi co-location (QCL) connection between a target reference signal and a source reference signal.

16. The system of claim 15, wherein the TCI-state information is received via a downlink control information (DCI) signal from a base station, and wherein the TCI-state information comprises information regarding a TCI codepoint with at least one indicated TCI-state.

17. The system of claim 13, wherein causing the user equipment to apply the one or more initialization parameters for at least one UL SRS transmission with the comb-offset hopping and cyclic-shift hopping comprises to applying the indicated TCI-state and respective initialization parameters.

* * * * *